United States Patent
Cone, II

Patent Number: 6,000,753
Date of Patent: Dec. 14, 1999

[54] CHILD CAR SEAT FOUNDATION

[75] Inventor: Richard E. Cone, II, Athens, Ohio

[73] Assignee: Cosco, Inc., Columbus, Ind.

[21] Appl. No.: 08/985,516

[22] Filed: Dec. 5, 1997

Related U.S. Application Data

[60] Provisional application No. 60/032,605, Dec. 5, 1996.

[51] Int. Cl.[6] ...................................................... A47C 1/08
[52] U.S. Cl. ................................ 297/256.16; 297/256.11; 297/253
[58] Field of Search .......................... 297/250.1, 256.16, 297/464, 256.1, 256.11, 256.14, 253

[56] References Cited

U.S. PATENT DOCUMENTS

| | | |
|---|---|---|
| D. 294,777 | 3/1988 | Wise et al. . |
| D. 321,449 | 11/1991 | Meeker . |
| D. 322,001 | 12/1991 | Meeker . |
| 3,596,986 | 8/1971 | Ragsdale . |
| 3,922,035 | 11/1975 | Wener . |
| 4,306,749 | 12/1981 | Deloustal . |
| 4,345,791 | 8/1982 | Bryans et al. . |
| 4,481,685 | 11/1984 | Watson . |
| 4,501,032 | 2/1985 | Heath et al. . |
| 4,545,613 | 10/1985 | Martel et al. . |
| 4,634,177 | 1/1987 | Meeker . |
| 4,733,909 | 3/1988 | Single, II et al. . |
| 4,743,063 | 5/1988 | Foster, Jr. . |
| 4,750,783 | 6/1988 | Toby et al. ......................... 297/256.16 |
| 4,754,999 | 7/1988 | Kain . |
| 4,915,446 | 4/1990 | Darling et al. . |
| 4,943,113 | 7/1990 | Meeker . |
| 4,998,307 | 3/1991 | Cone . |
| 5,005,234 | 4/1991 | Kelleher et al. . |
| 5,052,750 | 10/1991 | Takahashi et al. . |
| 5,110,182 | 5/1992 | Beauvals . |
| 5,277,472 | 1/1994 | Freese et al. . |
| 5,385,387 | 1/1995 | Kain . |
| 5,567,008 | 10/1996 | Cone, II . |

FOREIGN PATENT DOCUMENTS 2227719  11/1974  France .

OTHER PUBLICATIONS

Century Products Company, 590 Infant Car Seat/Carrier, 1993 Owner's Manual, four pages including cover sheet pp. 1, 6, and 7.

Primary Examiner—Milton Nelson, Jr.
Attorney, Agent, or Firm—Barnes & Thornburg

[57] ABSTRACT

An apparatus is provided for supporting a child car seat on a vehicle seat having a seat belt. The apparatus includes a seat foundation that is adapted to lie upon the vehicle seat. The seat foundation includes a base with an upper surface that is adapted to receive the child car seat thereon, side walls that extend away from the upper surface, and a seat-belt mounting catch, which is positioned to lie in the upper surface in a location between the side walls. In addition, the seat foundation includes an auxiliary belt coupled to the base. The auxiliary belt is adapted to cooperate with the base to couple the child car seat upon the seat foundation.

56 Claims, 10 Drawing Sheets

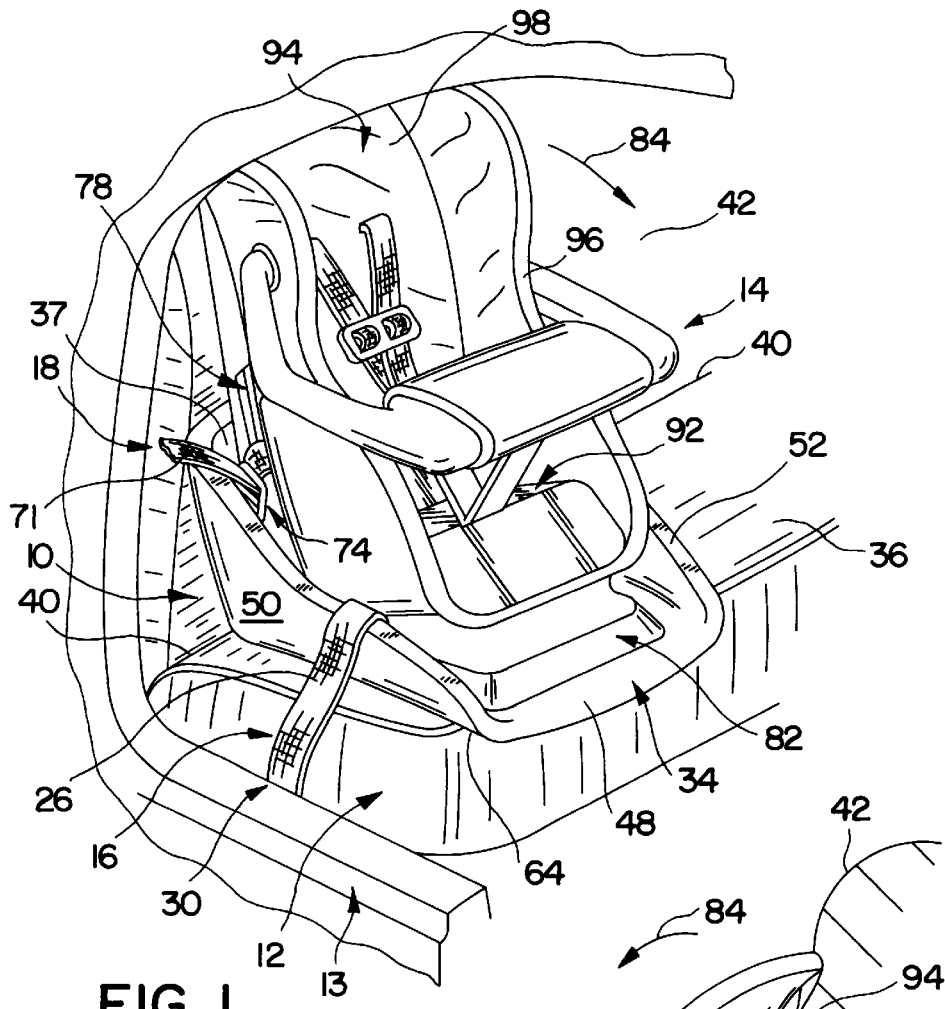
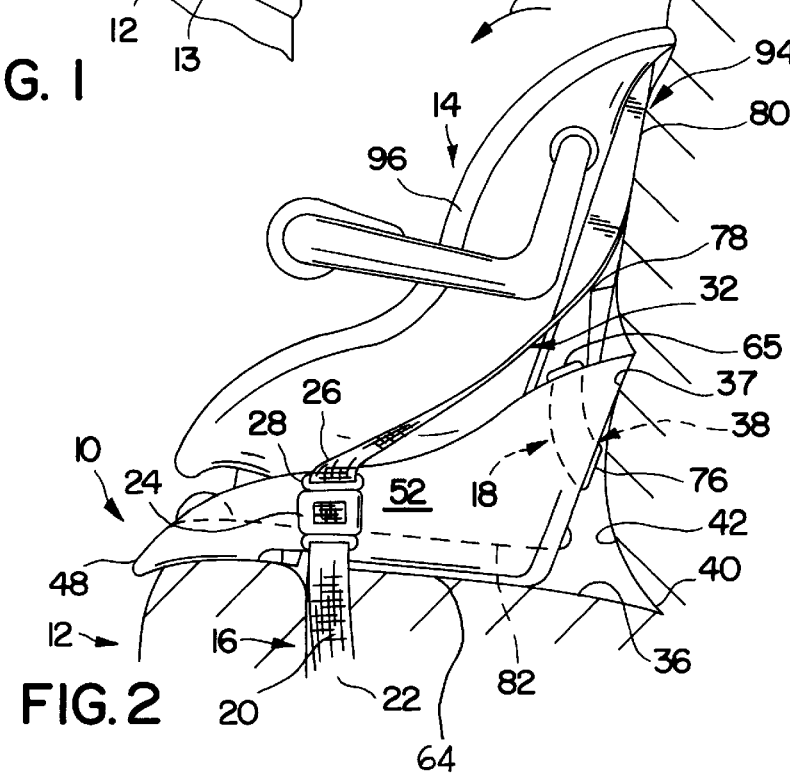

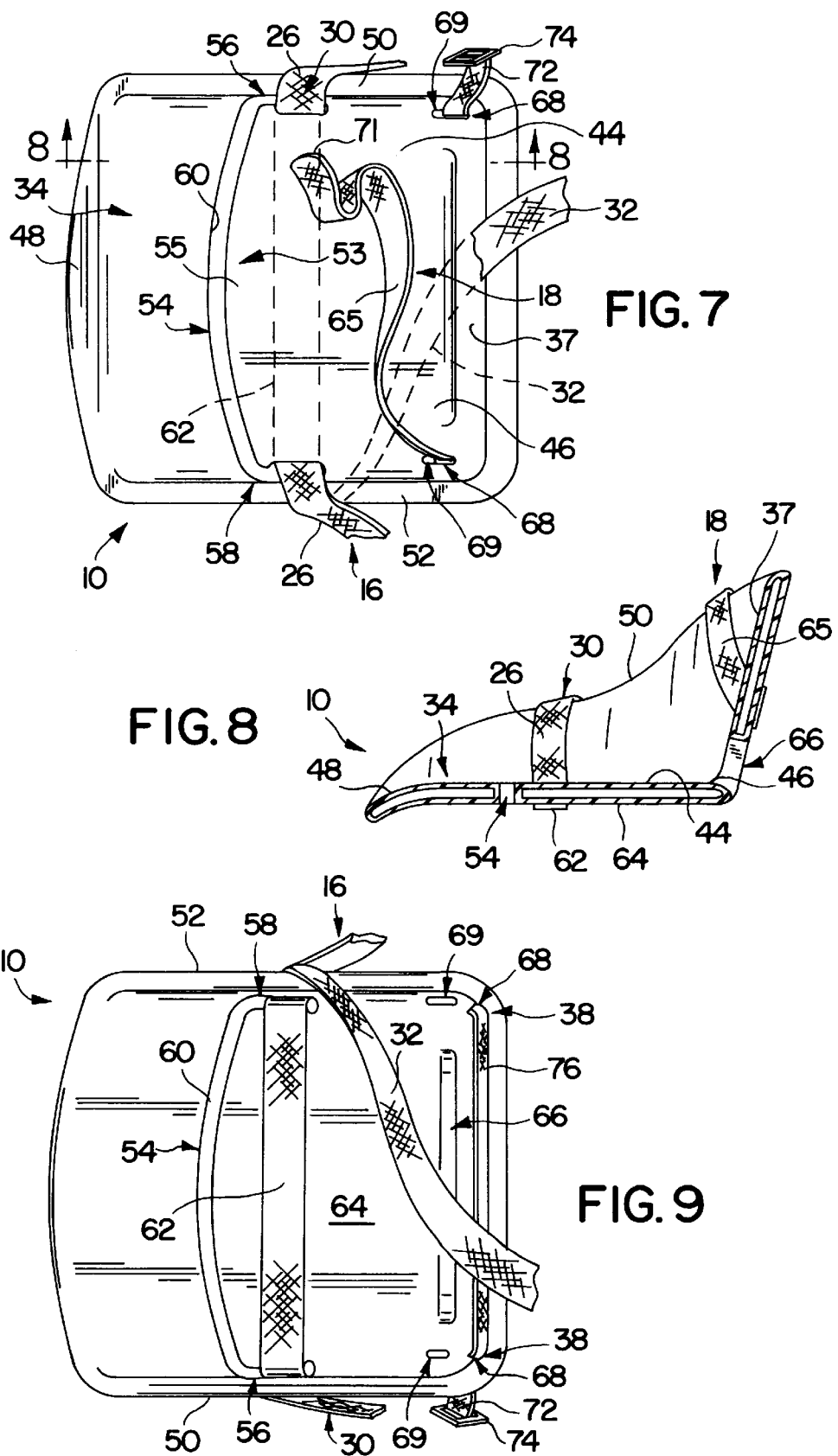

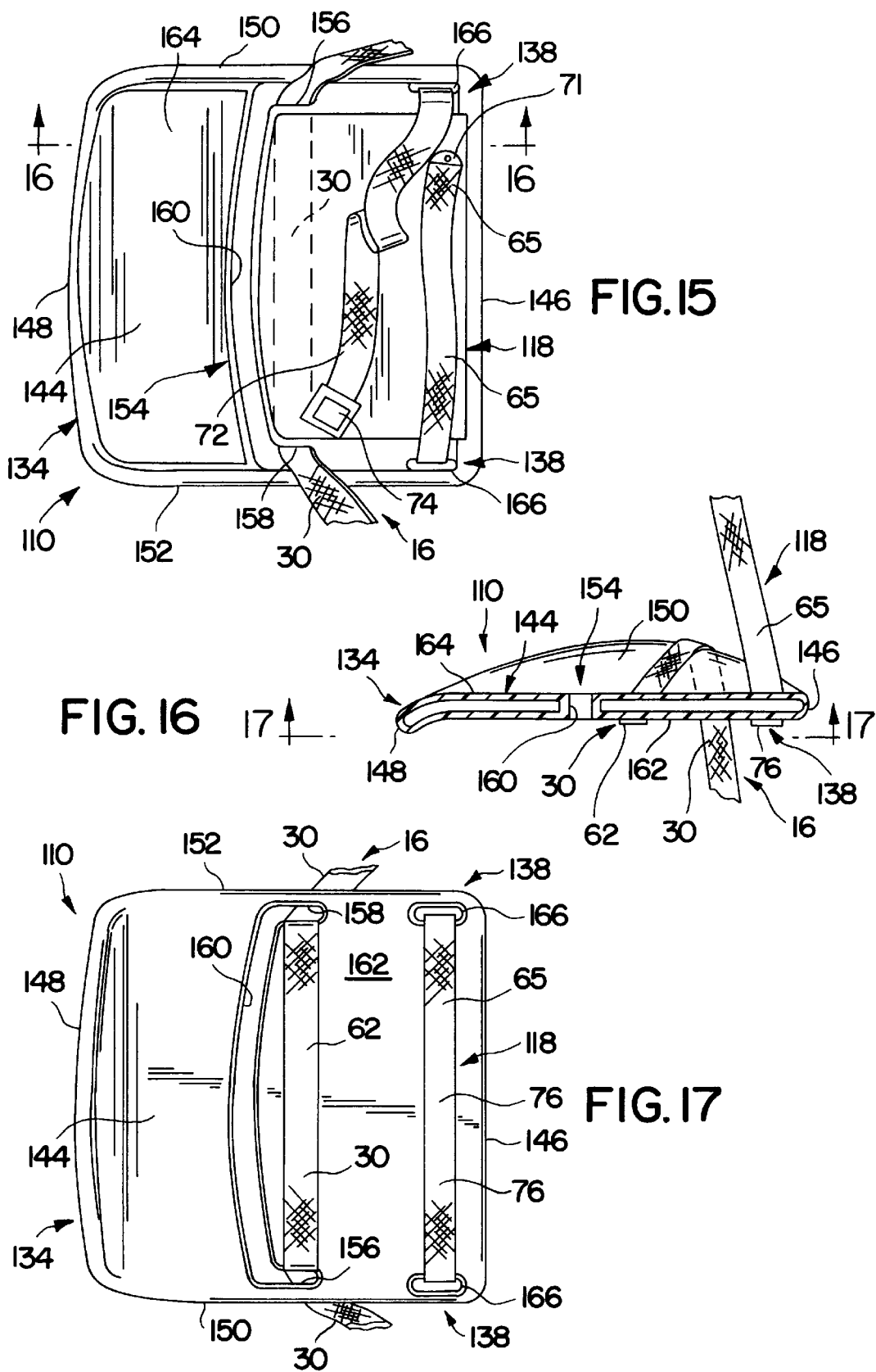

CHILD CAR SEAT FOUNDATION

This claims priority under 35 U.S.C. §119(e) of Ser. No. 60/032,605 filed Dec. 5, 1996.

BACKGROUND AND SUMMARY OF THE INVENTION

The present invention relates to a foundation for a child car seat, and particularly to a seat foundation that mounts and supports a child car seat on a seat in a vehicle. More particularly, the present invention relates to a seat foundation configured to set in an anchored position on a vehicle seat and to retain a child car seat in a generally fixed position thereon.

Child car seats are widely accepted as necessary appliances for transporting young children in automobiles or other vehicles. Infant car seats with detachable bases are known in the art. See, for example, U.S. Pat. Nos. 4,345,791 to Bryans et al., 4,733,909 to Single II et. al, U.S. Pat. No. 4,634,177 to Meeker, U.S. Pat. No. 5,277,472 to Freese et al., U.S. Pat. No. 4,943,113 to Meeker, and U.S. Pat. No. 5,567,008 to Cone, II.

According to the present invention, an apparatus is provided for supporting a child car seat on a vehicle seat having a seat belt. The apparatus includes a seat foundation that is adapted to lie upon the vehicle seat and that includes a base having an upper surface adapted to receive the child car seat thereon, spaced apart side walls extending away from the upper surface, and a seat-belt mounting catch positioned to lie between the side walls and an auxiliary belt coupled to the base. The auxiliary belt is adapted to cooperate with the base to couple the child car seat upon the seat foundation.

The car seat has a seat base sized for placement upon the upper surface of the seat foundation base between the side walls of the base, a child-receiving seat supported by the seat base, a back portion extending from the child-receiving seat, and an aperture formed in the back portion and an auxiliary belt coupled to the base. The auxiliary belt extends through the aperture formed in the back portion and cooperates with the base to couple the car seat selectively upon the seat foundation in a mounted position.

A method is provided herein for enhancing the stability of a child car seat having a seat base, a seat portion, and a seat back formed to include an aperture therein upon a vehicle car seat having a seat bottom, a seat back, and a seat belt having a lap portion and a shoulder portion is provided. The method includes the steps of providing a seat foundation including a base having an upper surface, a lower surface, a back edge, a front edge, spaced apart side walls extending away from the upper surface between the rear and front edges, and a slot extending through the base, the slot having short channels positioned to lie adjacent the side walls and a long channel extending between the short channels.

The method further includes the steps of providing an auxiliary belt that is coupled to the base selectively, positioning the base upon the seat bottom, extending the lap portion of the seat belt across the side walls and upper surface of the base, and pressing the lap portion into the long channel of the slot and toward the back edge of the base until the seat belt extends through the short channels and a portion of the seat belt is positioned to lie adjacent the lower surface of the base. In addition, the method includes the steps of positioning the seat base of the car seat upon the upper surface of the seat foundation, extending the auxiliary belt from the base through the aperture formed in the seat back of the car seat, and tightening the auxiliary belt until the seat base of the car seat is coupled to the upper surface of the seat foundation in a mounted position.

Additional features and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of a seat foundation in accordance with the present invention fixed in place on a vehicle seat by a seat belt anchored to the vehicle and showing a child car seat mounted in a fixed position on a seat pad included in the seat foundation by an auxiliary belt anchored to the seat foundation to enhance stability of the child car seat on the vehicle seat;

FIG. 2 is a side elevation of the seat foundation and child car seat of FIG. 1 showing the vehicle seat having a seat bottom, a seat back, and a three-point seat belt having a lap portion anchored to the seat bottom at an anchor point that is spaced forward of and apart from the seat back of the vehicle seat and the seat foundation having a back portion adjacent the seat back of the vehicle and showing the seat pad of the seat foundation coupled to the lap portion of the seat belt and the back portion of the seat foundation coupled to the child car seat via the auxiliary belt at an anchor point in close proximity to the seat back of the vehicle seat on which the seat foundation rests;

FIG. 7 is a plan view of the seat foundation of FIGS. 1–6 showing the relative positioning of the lap portion and the shoulder portion of the seat belt relative to the base and side walls of the seat foundation and showing the auxiliary belt extending through one set of slots formed in the back portion of the seat foundation;

FIG. 8 is a view taken along line 8—8 of FIG. 7 showing the lap portion of the seat belt extending over one upright side wall, the window extending through the back portion of the seat foundation, and the auxiliary belt extending through the back portion;

FIG. 9 is a bottom view of the seat foundation of FIGS. 1–8 showing the lap portion of the vehicle seat belt extending across a lower surface of the base and the shoulder portion and lap portion of the seat belt coupled together adjacent one upright side wall of the seat foundation;

7 FIG. 15 is a plan view of the seat foundation of FIGS. 11–14 showing the relative positioning of the lap portion and the shoulder portion of the seat belt to the base and to the side walls of the seat foundation and showing the auxiliary belt extending through the slots formed in the base of the seat foundation;

FIG. 16 is a view taken along line 16—16 of FIG. 15 showing the lap portion of the seat belt extending over one upright side wall and the auxiliary belt extending through the base;

FIG. 17 is a bottom view of the seat foundation of FIGS. 11–16 showing the lap portion of the seat belt and the auxiliary belt extending across a lower surface of the base;

DETAILED DESCRIPTION OF THE DRAWINGS

Figure 3:
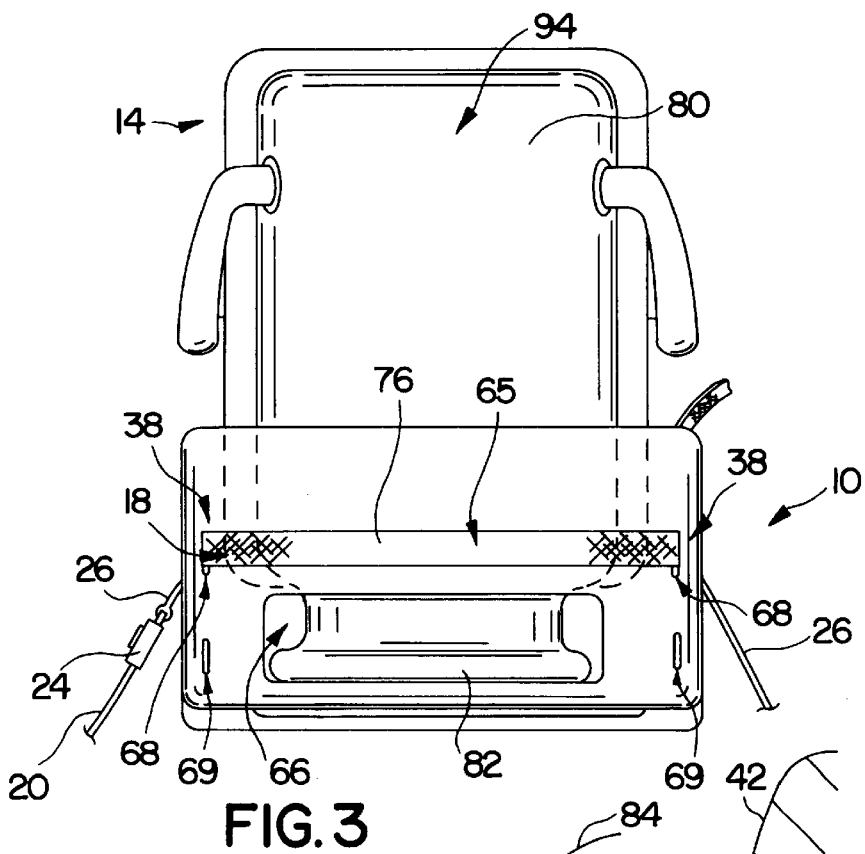
FIG. 3 is a back view of the seat foundation and child car seat of FIGS. 1 and 2 showing the back portion of the seat foundation having a window and two pairs of spaced-apart auxiliary slots extending therethrough and showing the auxiliary belt extending through one pair of the auxiliary slots.

As shown in FIG. 1, a seat foundation 10 in accordance with the present invention is placed on a vehicle seat 12 in a vehicle 13 and supports a child car seat 14. Manufacturers of automobiles and other vehicles have begun to provide vehicle seats that have a seat bottom, a seat back, and a three-point seat belt having a lap portion anchored to the seat bottom at an anchor point that is spaced forward of and apart from the seat back of the vehicle seat. Seat foundation 10 facilitates mounting of a child car seat onto such vehicle seats to enhance stability of the child car seat 14 on the vehicle seat 12.

Although seat foundation 10 is shown in a fixed position on a "bench" seat, seat foundation 10 is suitable for use on many different kinds of vehicle seats including "bucket" seats (not shown). A vehicle seat belt 16 fixes the position of seat foundation 10 on vehicle seat 12 so that seat foundation 10 provides a platform for supporting any one of a variety of child car seats including child car seat 14. An auxiliary belt 18 or connector fixes the position of child car seat 14 on seat foundation 10 to enhance stability of child car seat 14 on vehicle seat 12.

Figure 4:
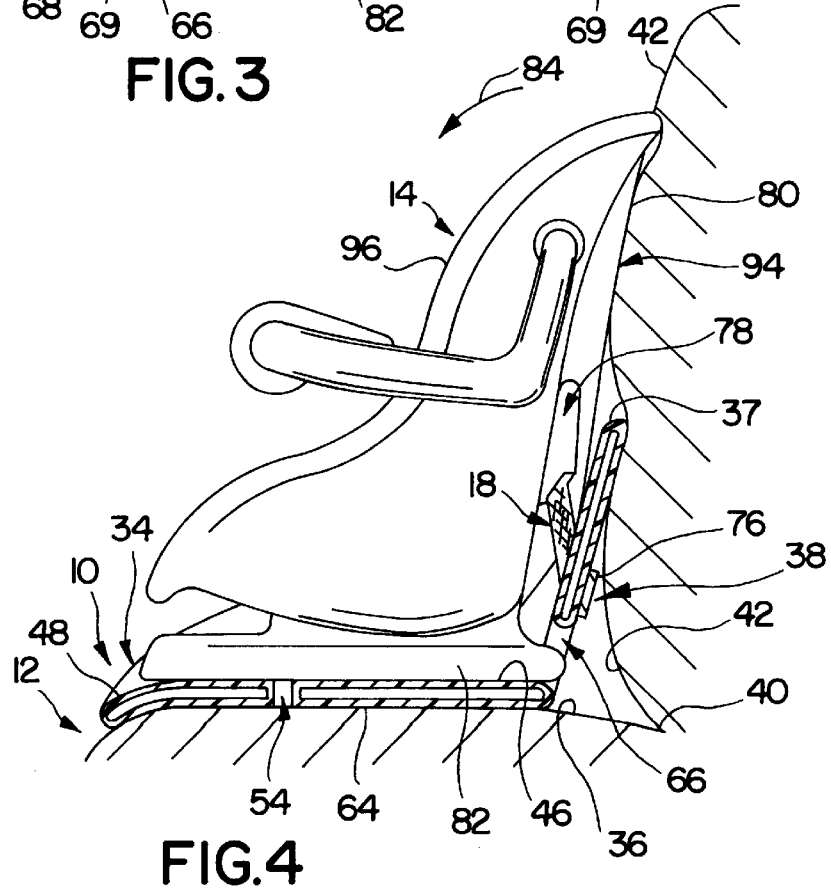
FIG. 4 is a view similar to FIG. 2, with portions of the seat foundation broken away, showing the child car seat having a belt-receiving aperture, the seat pad including a slot therethrough and showing the auxiliary belt extending through the belt-receiving aperture and engaging the back portion.

Vehicle seat 12 includes a seat bottom 36 and a seat back 42 extending from seat bottom 36. As best shown in FIGS. 1 and 4, a junction line 40 extends between seat bottom 36 and seat back 42.

Seat belt 16 is coupled to vehicle seat 12 and includes a fixed strap 20 having one end anchored to seat bottom 36 of vehicle seat 12 at seat anchor point 22 and another end carrying a buckle-locking mechanism 24 as shown best in FIG. 2. Seat belt 16 also includes a movable strap 26 carrying a buckle 28 (e.g., strap guide and buckle plate) for connecting to buckle-locking mechanism 24 on fixed strap 20. Buckle 28 is movable along movable strap 26 to position movable strap 26 and to form a lap portion 30 and a shoulder portion 32 of seat belt 16. Once buckle 28 is coupled to buckle-locking mechanism 24, lap portion 30 engages seat foundation 10 to hold seat foundation 10 in a fixed position on vehicle seat 12 so that seat foundation 10 provides a platform for supporting child car seat 14. Although vehicle seat belt 16 is shown in FIG. 2 to be a three-point seat belt system, a conventional vehicle lap belt can be used to mount seat foundation 10 in place on vehicle seat 12.

Child car seat 14 includes a base 82 configured to set directly on seat bottom 36 of vehicle seat 12 and a child-receiving seat 92 supported by base 82. In addition, child car seat 14 includes a back portion 94 extending from child-receiving seat 92 and a lip 96 extending between back portion 94 and seat 92. Back portion 94 includes a front side 98 and an opposite rear side 80. A belt-receiving slot or aperture 78 is formed in rear side 80 of child car seat 14 a shown, for example, in FIGS. 1, 2, and 4. Child car seat 14 is one example of a child car seat having base 82 and child-receiving seat 92 and is disclosed, for example, in U.S.

Pat. No. 5,538,332 to Cone et al., the specification of which is incorporated herein by reference. Any one of a wide variety of child car seats including, for example, "convertible" car seats and other car seats could be mounted and supported on vehicle seat foundation 10 to enhance stability of the child car seat 14 on vehicle seat 12.

Figure 5:
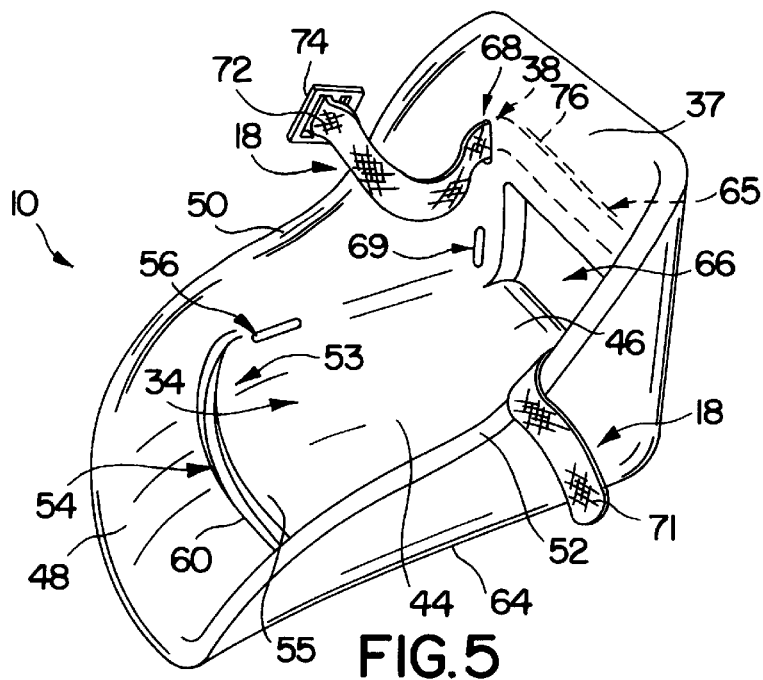
FIG. 5 is a perspective view of the seat foundation of FIGS. 1–4 showing the seat pad including a base formed to include a lateral slot for receiving the lap portion of a three-point seat belt, a pair of upright side walls extending from the base and arranged to lie in laterally spaced-apart relation to one another, and the back portion extending between the side walls and having sets of slots therethrough that are each sized to receive the auxiliary belt and showing a portion of the auxiliary belt extending through one set of slots and positioned to lie above the base and between the side walls at the rear of the base.

Referring now to FIG. 4, seat foundation 10 includes a seat pad 34 configured to rest on seat bottom 36 and a back portion 37 configured to rest on seat back 42 and to anchor auxiliary belt 18. As shown in FIG. 5, seat pad 34 of seat foundation 10 includes a rectangular base 44 having a back edge 46, a front edge 48, and a pair of upright, ramped side walls 50, 52 lying in spaced-apart relation and extending between back edge 46 and front edge 48 of base 44. Base 44 has a lower surface 64 facing toward vehicle seat 12 and an opposite upper surface 70.

Base 44 is also formed to include a seat-belt mounting catch 53 that is positioned to lie between side walls 50, 52 as best shown in FIG. 5. Catch 53 includes a C-shaped slot 54 extending between lower surface 64 and upper surface 70. Slot 54 has a first short channel 56 extending along side wall 50, a second short channel 58 extending along side wall 52, and a long curved channel 60 interconnecting first and second short channels 56, 58 and extending between side walls 50, 52. Short channels 56, 58 extend from long channel 60 toward back portion 37 to define a tab portion 55 that is adapted to engage seat belt 16 selectively. C-shaped slot 54 is positioned to lie between back edge 46 and front edge 48 of seat foundation 10.

C-shaped slot 54 is sized to receive lap portion 30 of vehicle seat belt 16 as shown in FIGS. 6–9 so as to hold seat foundation 10 in a fixed position on vehicle seat 12 to provide a platform for child car seat 14. It is understood that C-shaped slot 54 may take on a variety of shapes so long as seat belt 16 is held is a generally stationary portion and seat foundation 10 is prevented from sliding on seat bottom 36 when in the fixed position. In addition, it is understood that a variety of mounting mechanisms such as hooks, snaps, buckles, and the like may be used to couple seat belt 16 to foundation 10.

Back portion 37 of seat foundation 10 is positioned to lie adjacent to back edge 46 of seat foundation 10 and to extend between upright side walls 50, 52. As best shown in FIG. 3, back portion 37 is formed to include a window 66 and sets of spaced-apart slots 68, 69 therethrough. Foundation anchor points 38 on back portion 37 are defined by sets of slots 68, 69. Auxiliary belt 18 is coupled to back portion 37 vertically above junction line 40 of vehicle seat 12. Auxiliary belt 18 is a single strap 65 having one end 71, another end 72 carrying a buckle-locking mechanism 74, and a middle section 76 that extends between ends 71, 72. The length of middle section 76 is varied selectively by changing the distance that end 71 is spaced apart from mechanism 74. It is understood that a wide variety of locking mechanisms such as hook-and-eye type fasteners, snaps, ties, buttons and the like may be used to couple opposite ends 71, 72 together and fasten auxiliary belt onto back portion 37. Both ends 71, 72 are situated above seat pad 34 when auxiliary belt 18 is coupled to back portion 37. It is also understood that various connectors may be used to couple child car seat 14 to seat foundation 10.

Figure 6:
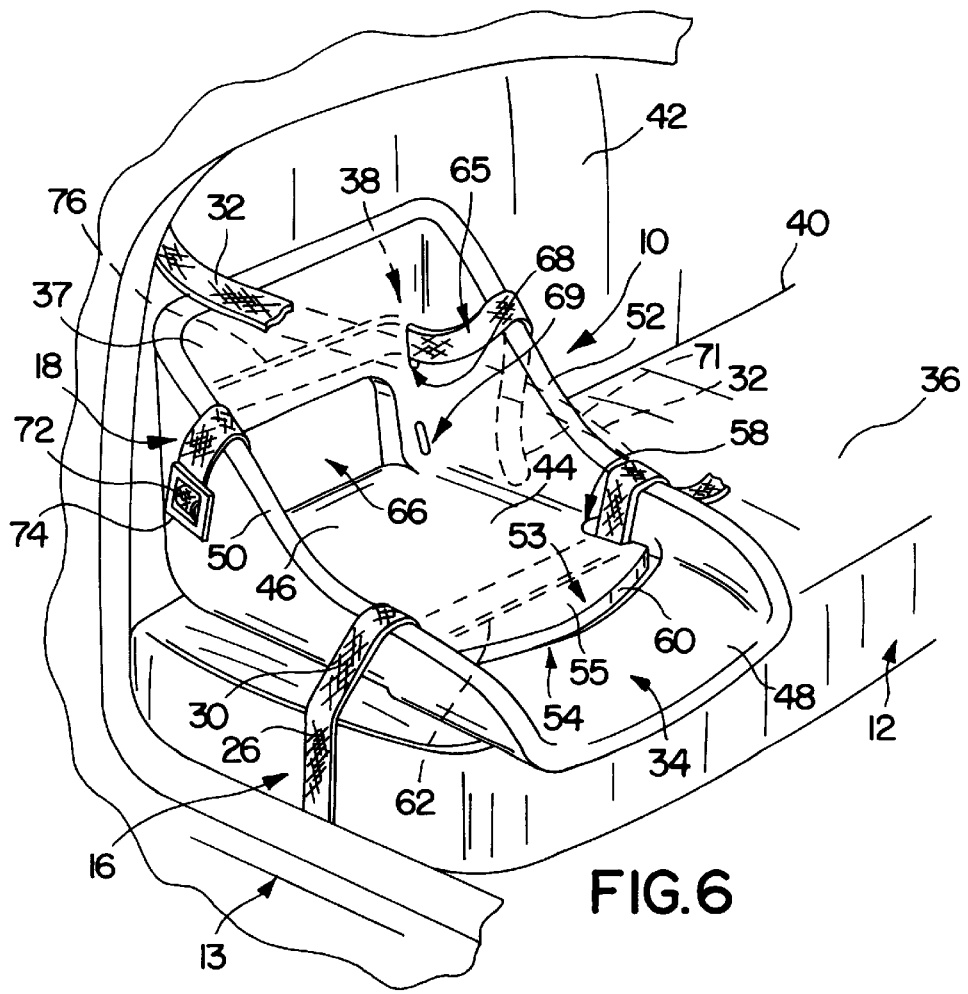
FIG. 6 is a perspective view of the seat foundation of FIGS. 1–5 anchored on the seat bottom of the vehicle seat by the lap portion of the seat belt and showing extension of the lap portion through the lateral slot formed in the base and the position of a shoulder portion of the vehicle seat belt relative to the base and to the seat back of the vehicle seat.

Seat foundation 10 is shown in a mounted position on vehicle seat 12 in FIG. 6. To couple seat foundation 10 on vehicle seat 12, lap portion 30 of seat belt 16 is first laid over base 44 and side walls 50, 52. Then, lap portion 30 is pressed downwardly into underlying long channel 60 extending across base 44, and rearwardly toward back edge 46 to engage lap portion 30 in first and second short channels 56, 58 formed in base 44 as shown, for example, in FIGS. 6 and 7. Once lap portion 30 lies within channels 56, 58, a section 62 of lap portion 30 engages lower surface 64 of base 44 as shown, for example, in FIGS. 8 and 9.

Once seat foundation 10 is coupled to sat 12, child car seat 14 is secured onto foundation 10. Child car seat 14 is installed on seat foundation 10 to assume a forward facing mounted position in the following manner. Strap 65 of auxiliary belt 18 is passed through set of slots 68 and then through belt-receiving slot 78 formed along rear side 80 of child car seat 14 as shown in FIGS. 1–4. Strap 65 is tightened until belt 18 is generally slack-free causing base 82 of child car seat 14 to move toward and eventually to engage base 44 of seat pad 34. Specifically, rear side 80 of child car seat 14 engages back portion 37 of foundation 10, thereby anchoring child car seat 14 in a mounted and supported position on seat foundation 10. Window 66 of seat foundation 10 allows the user to position seat 14 on seat pad 34 easily.

When seat foundation 10 is installed on vehicle seat 12, foundation anchor point 38 is located along seat back 42 in a position vertically above junction 40 of vehicle seat 12 as shown, for example, in FIGS. 2 and 4. Auxiliary belt 18 functions to hold child car seat 14 in place against seat portion 37 and vehicle seat back 42 once seat foundation 10 is installed on vehicle seat 12 as shown, for example, in FIGS. 1 and 2. By anchoring child car seat 14 to seat foundation 10 at foundation anchor point 38 located above junction line 40 of vehicle seat 12, forward rotating movement of child car seat 14 in direction 84 (FIG. 1) relative to vehicle seat 12 during sudden stops of vehicle 13 is minimized.

Figure 10:
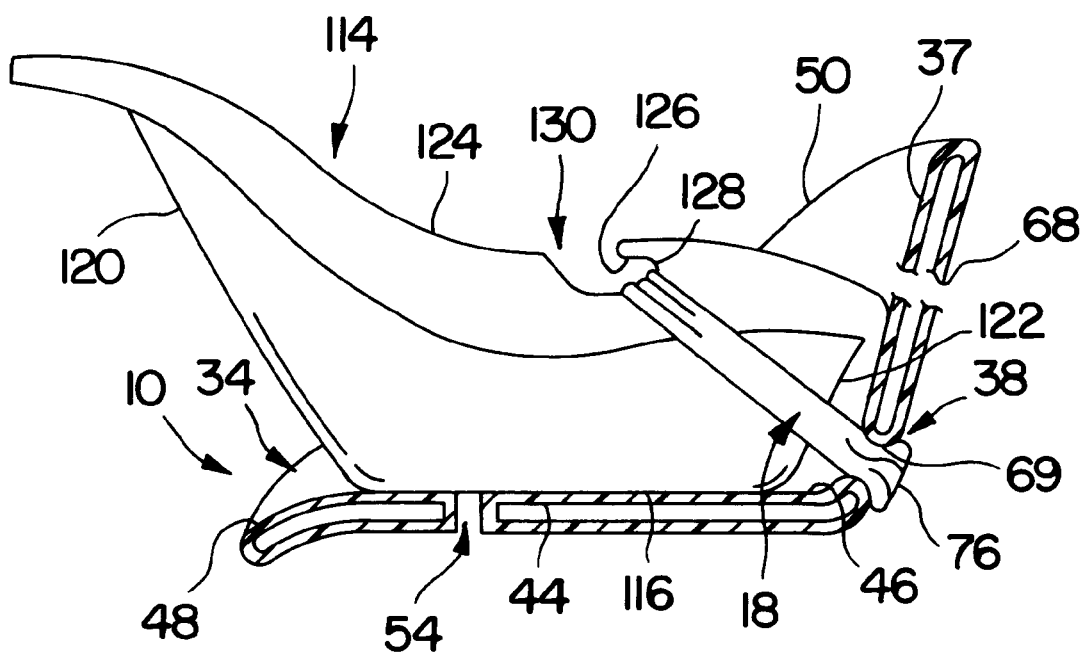
FIG. 10 is a side elevation, with portions of the seat foundation broken away, showing a rear-facing child car seat fastened in the seat foundation of FIGS. 1–9 in a reversed position and showing the auxiliary belt extending through a slot adjacent the base and through a notch defined in a side lip of the child car seat.

Seat foundation 10 is formed to receive a variety of child car seats thereon. For example, seat foundation 10 is configured to receive a child car seat 114 thereon in a rear facing mounted position. Car seat 114 includes a bottom 116, a rear side 120, an opposite front side 122, and an upper lip 124 extending between rear side 120 and front side 122. In addition, upper lip 124 includes spaced apart notches 126 therein. Notches 126 include a closed end 128 and an open end 130 facing rear side 120 as shown in, for example, in FIG. 10. To mount child car seat 114 upon seat foundation 10 in the rear facing mounting position, strap 65 of auxiliary belt 18 is first passed through slots 69 formed in back portion 37. Strap 65 then passes through notches 126, one of which is illustrated in FIG. 10, formed in upper lip 124. Strap 65 is tightened causing strap 65 to engage closed end 128 and bottom 116 of seat 114 to engage base 44 of seat pad 34. At least a portion of car seat 114 engages back portion 37 of seat foundation 10, thereby anchoring child car seat 114 in a mounted and supported rear-facing position on seat foundation 10.

A car seat foundation 110 is provided in FIGS. 11–17. Like seat foundation 10, vehicle seat belt 16 is used to secure seat foundation 110 on vehicle seat 12 in order to provide a platform for supporting any one of a variety of child car seats including child car seat 14. Seat foundation 110 includes an auxiliary belt 118 or a connector and a seat pad 134 configured to rest on seat bottom 36 included in vehicle seat 12 and to anchor auxiliary belt 118. Auxiliary belt 118 is coupled to seat pad 134 at foundation anchor points 138 on each side of seat pad 134. See FIG. 13. Anchor points 138 are positioned to lie in close proximity to junction line 40. See FIG. 12. Auxiliary belt 118 fixes the position of child car seat 14 on seat foundation 110 to enhance stability of child car seat 14 on vehicle seat 12.

Figure 13:
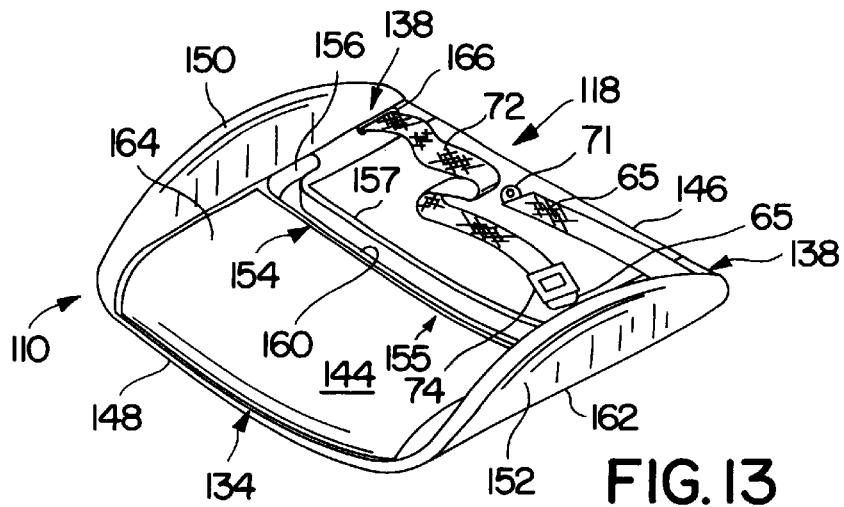
FIG. 13 is a perspective view the seat foundation of FIGS. 11 and 12 showing he base formed to include a lateral slot for receiving the lap portion of the seat belt and a pair of upright side walls extending from the base and arranged to lie in laterally spaced-apart relation to one another, and the base having a set of slots therethrough that are each sized to receive the auxiliary belt and showing the auxiliary belt extending through the slots.
Figure 14:
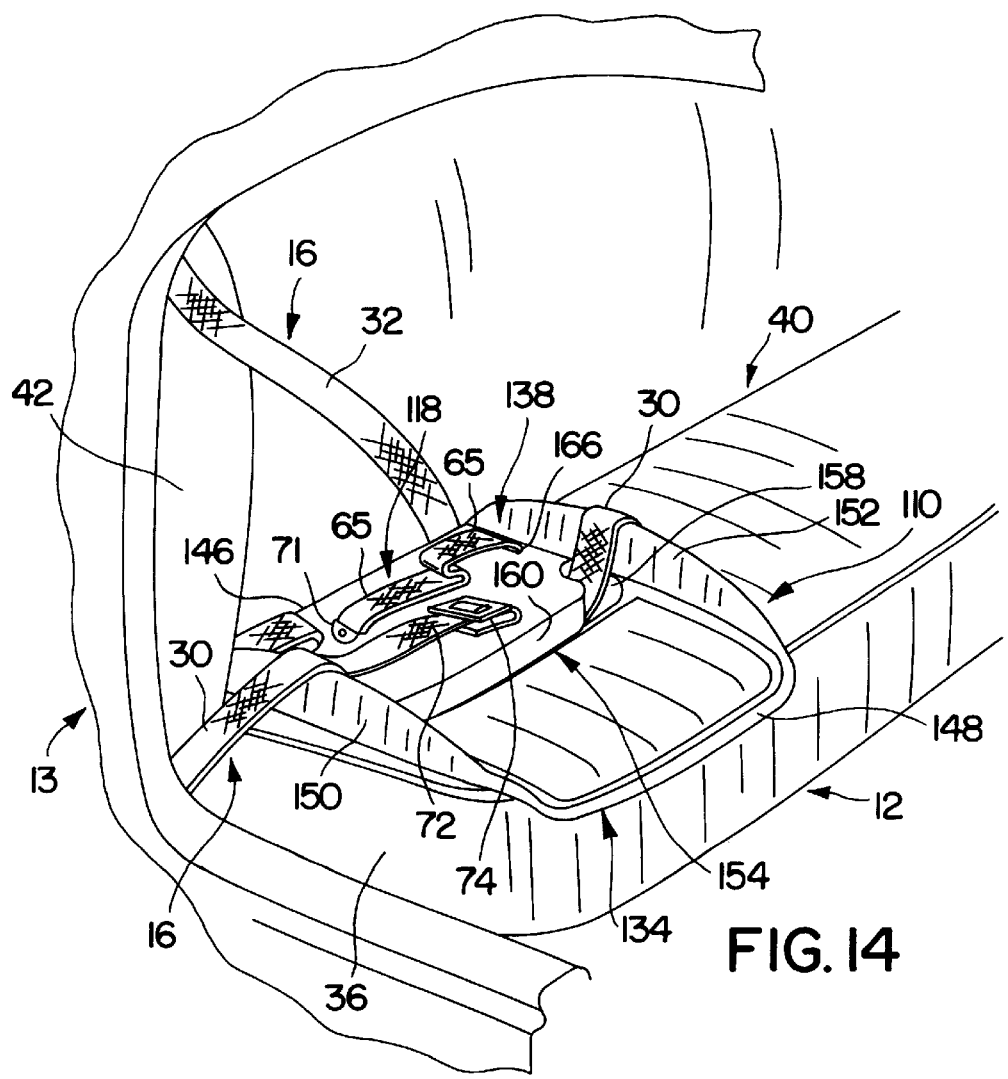
FIG. 14 is a perspective view of the seat foundation of FIGS. 11–13 anchored on the seat bottom of the vehicle seat by the lap portion of the seat belt sand showing extension of the lap portion through the lateral slot and the relative position of the shoulder portion and the base.
Figure 18:
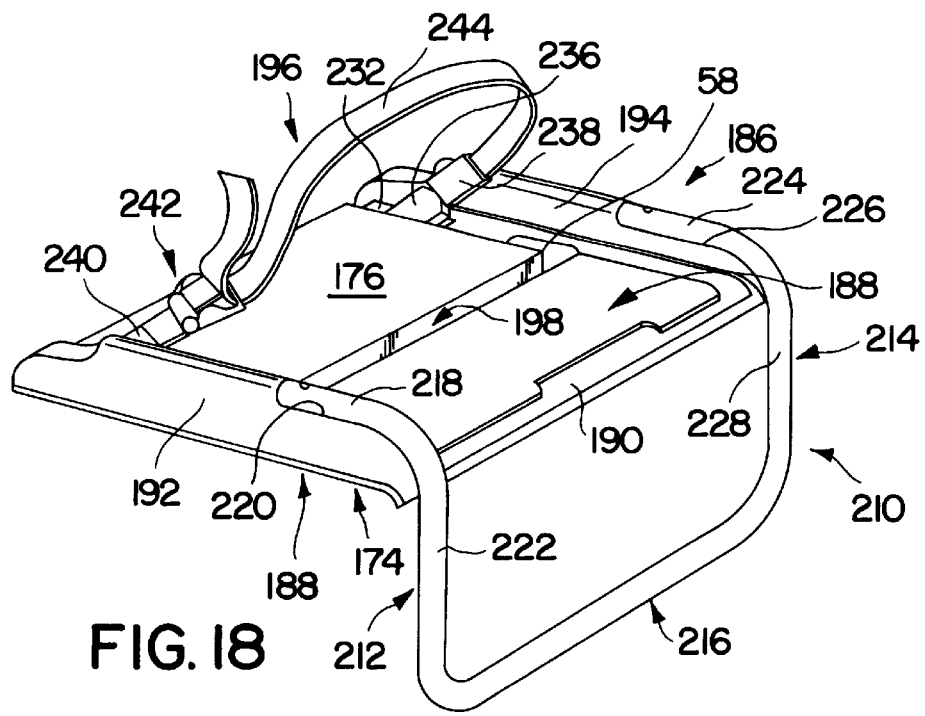
FIG. 18 is a perspective view of a seat foundation including a base having a lateral slot for receiving the lap portion of the seat belt, a pair of upright side walls extending from the base and arranged to lie in laterally spaced-apart relation to one another, a stabilizer bar affixed to a front edge of the seat pad, and an auxiliary belt affixed to a back edge of the seat pad.
Figure 19:
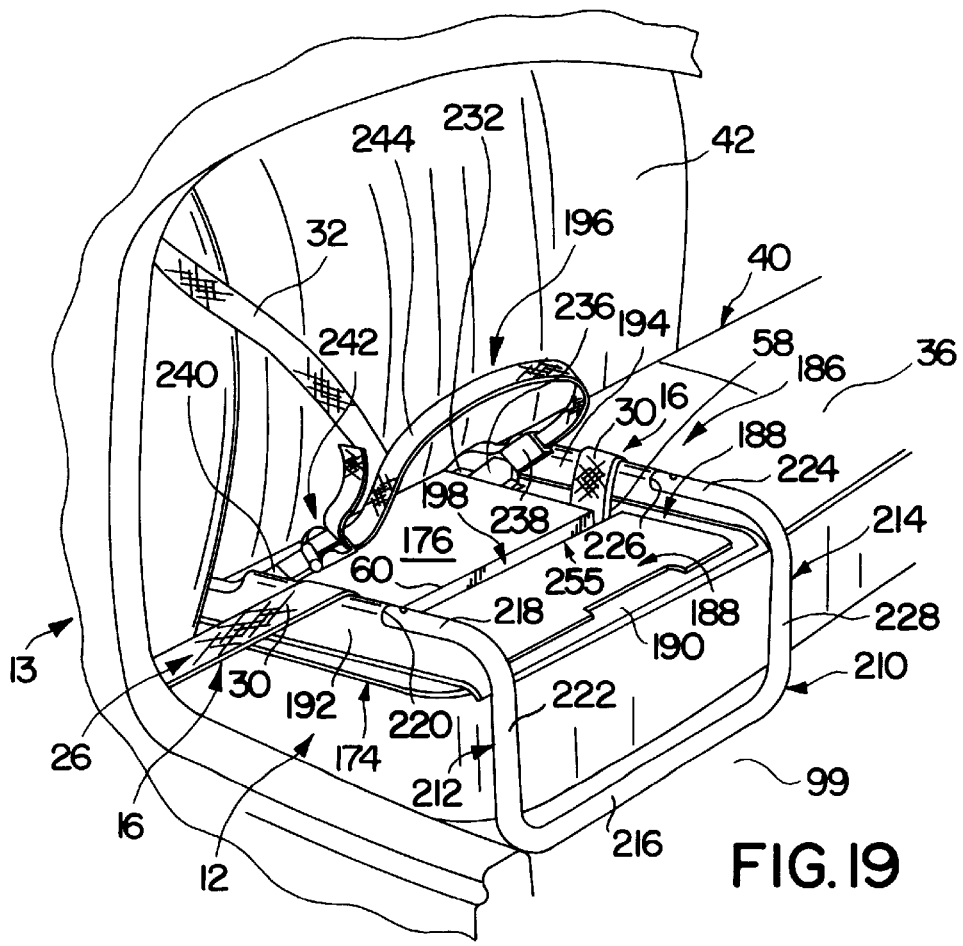
FIG. 19 is a perspective view of the seat foundation of FIG. 18 installed on a vehicle seat to cause the stabilizer bar to engage a portion of a floor in the vehicle adjacent to a front edge of the vehicle seat.

Referring now to FIG. 13, seat pad 134 of seat foundation 110 includes a rectangular base 144 having a back edge 146, a front edge 148 and a pair of upright ramped side walls 150, 152 lying in spaced-apart parallel relation and extending between back and front edges 146, 148 of base 144. Base 144 has a lower surface 162 and an opposite upper surface 164. Base 144 is also formed to include a catch 155 that includes a C-shaped slot 154 extending between lower surface 162 and upper surface 164. Slot 154 has a first short channel 156 extending along side wall 150, a second short channel 158 extending along side wall 152, and a long channel 160 interconnecting first 156 and second short channels 156, 158 and extending between side walls 150, 152. A tab portion 157 is defined by channels 156, 158, 160. C-shaped slot 154 is sized to receive lap portion 30 of vehicle seat belt 15 as shown, for example, in FIGS. 14–17 thus holding seat foundation 110 in a fixed position on vehicle seat 12 providing a platform for child car seat 14.

Base 144 of seat pad 134 is also formed to include two spaced-apart slots 166 positioned to lie adjacent to back edge 146 to define a retaining portion. See FIG. 17. Slots 166 are positioned to lie adjacent upright side walls 150, 152 and are sized to receive auxiliary belt 118 therein. Foundation anchor points 138 on base 144 are defined by slots 166. It is understood that while slots 166 are illustrated and described, a wide variety of retaining portions may be used to couple with the connector to hold child car seat 14 upon seat foundation 110. Auxiliary belt 118 is formed similarly to belt 18 as previously discussed and like reference numerals will be used to denote like components.

Seat foundation 110 is secured to vehicle seat 12 in much the same way as seat foundation 10. Essentially, lap portion 30 of vehicle seat belt 16 is first laid over base 144 and side walls 150, 152. Lap portion 30 is then pressed downwardly into underlying long channel 160 extending across base 144, and finally pushed rearwardly toward back edge 146 to engage laterally spaced-apart first and second short channels 156, 158 formed in base 144. Once installed, section 62 of lap portion 30 engages lower surface 162 of base 144 as shown, for example, in FIGS. 16 and 17.

Figure 11:
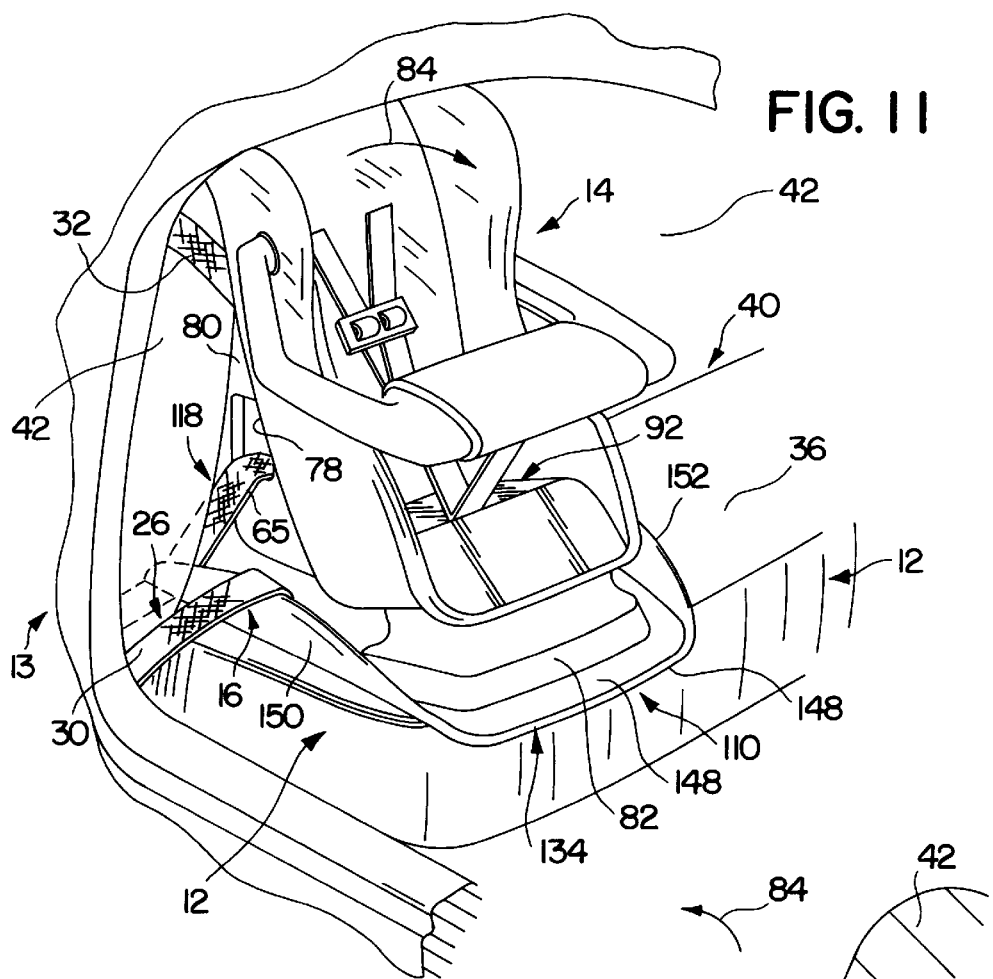
FIG. 11 is a perspective view of a seat foundation fixed in place on the vehicle seat by the three-point seat belt anchored to the vehicle and showing the car seat mounted in a fixed position on a seat pad included in the seat foundation by an auxiliary belt anchored to the seat pad.
Figure 12:
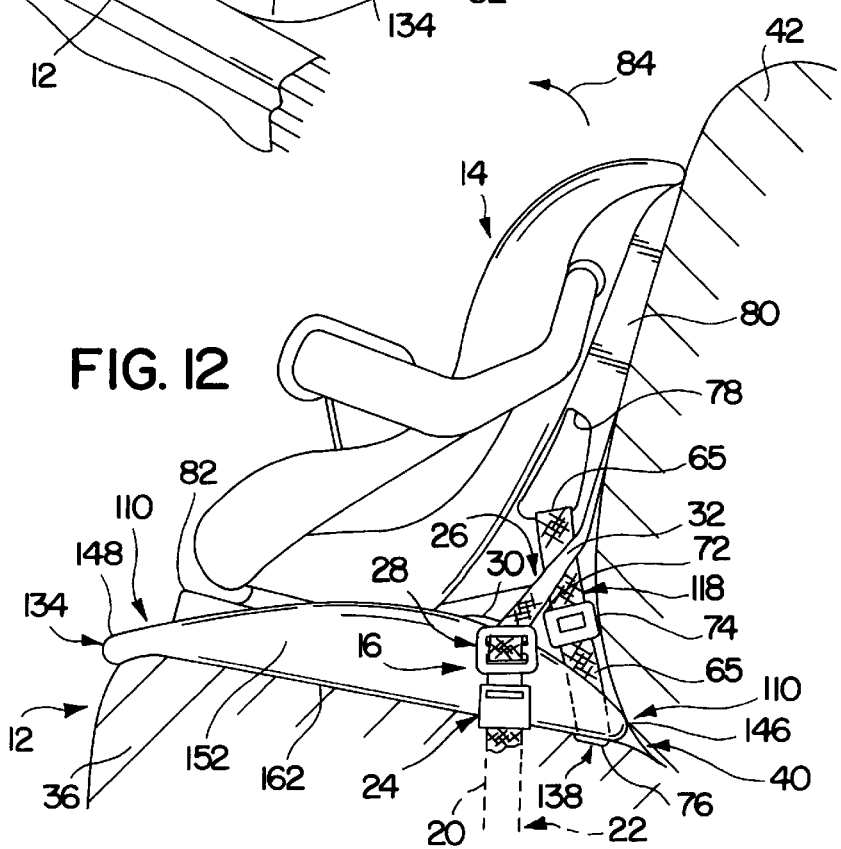
FIG. 12 is a side elevation of the seat foundation of FIG. 11 showing the seat pad including a base coupled to the lap portion of the seat belt and a pair of upright side walls appended to the base and arranged to lie in laterally spaced-apart relation to one another and showing a portion of the auxiliary belt positioned to lie above the base and between the side walls at the rear of the base.

Child car seat 14 is coupled to seat foundation 110 in the following manner. Strap 65 of auxiliary belt 18 is passed through slots 166 and through belt-receiving slot 78 formed along rear side 80 of child car seat 14 as shown in FIGS. 11–12. Strap 65 is tightened causing base 82 of child car seat 14 to move toward and eventually engage base 144 of seat pad 134. Specifically, rear side 80 of child car seat 14 engages seat back 42 of seat 12 and base 82 engages upper surface 162 of base 144, thereby anchoring child car seat 14 in a mounted and supported position on seat foundation 110.

A seat foundation 186 is provided and illustrated in FIGS. 18–21. Seat foundation 186 includes a seat pad 188 having a base 190 configured to rest on bottom of car seat (not shown). Base 190 includes a back edge 170, a front edge 172, and pair of upright side walls 192, 194 lying in spaced-apart relating and extending between back edge 170 and front edge 172. Base 190 has an lower surface 174 and an opposite upper surface 176. Base 190 is formed to include a mounting catch 255. Catch 255 includes a C-shaped slot 198 extending between upper surface 176 and lower surface 174 for receiving vehicle seat belt 16. Slot 198 is formed in a similar manner as slot 54 and like reference numerals are used to denote like components. An auxiliary belt 196 is also provided to couple child car seat 14 to pad 188.

A stabilizer bar 210 is coupled to seat foundation 186 to engage vehicle a floor 99 of vehicle 13 to limit movement of seat pad 188 relative to vehicle seat 12 when seat foundation 186 is anchored on vehicle seat 12. Stabilizer bar 210 includes a first L-shaped support arm 212, a second L-shaped support art 214, and a horizontal floor brace 216 interconnecting arms 212 and 214. First L-shaped support arm 212 includes a horizontal limb 218 mounted in a channel 220 formed in a forward end of upright side wall 192 and a vertical limb 222 interconnecting horizontal limb 218 and floor brace 216. Second L-shaped support art 214 includes a horizontal limb 224 mounted in a channel 226 formed in forward end of upright side wall 194 and vertical limb 228 interconnecting horizontal limb 224 and floor brace 216.

Figure 20:
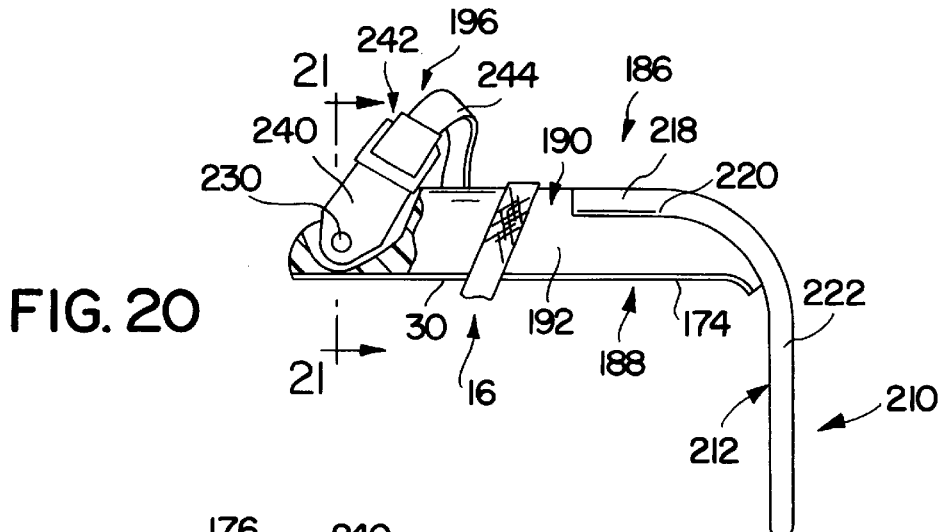
FIG. 20 is a side elevation, with a portion of the base of the seat foundation of FIGS. 18 and 19 broken away, showing an anchor point of the auxiliary belt.
Figure 21:
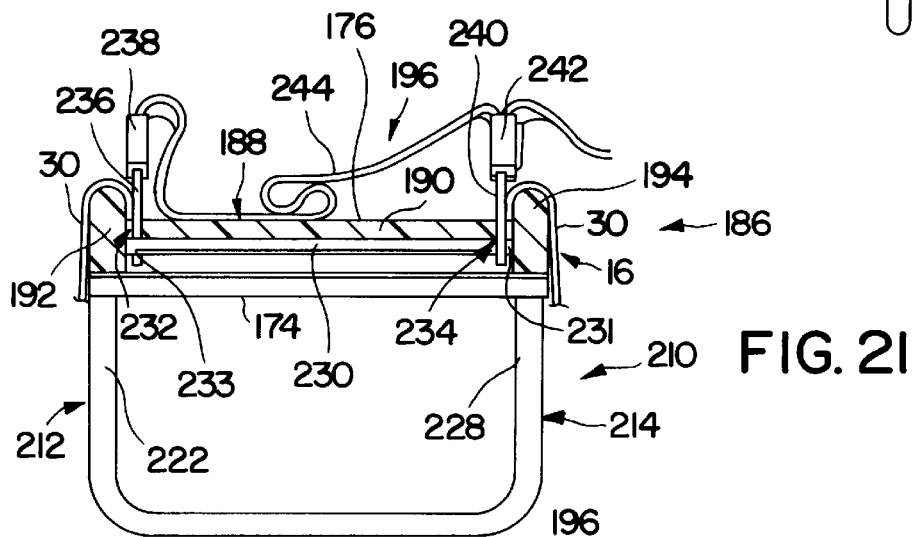
FIG. 21 is a view taken along line 21—21 of FIG. 20 showing two spaced-apart anchor points of the auxiliary belt on a transverse rod fixed to the rear portion of the seat pad.

Seat foundation 186 also includes a sturdy mounting rod 230 fixed to seat pad 188 as shown, for example, in FIGS. 20 and 21 to provide an anchor for auxiliary belt 196. One end 233 of mounting rod 230 is fixed to a portion of seat pad 188 adjacent to side wall 192 and another end 231 of mounting rod 230 is fixed to a portion of seat pad 188 adjacent to side wall 194. Mounting rod 230 is mounted underneath base 190 as shown, for example, in FIG. 21. Base 190 is formed to include two slots 232, 234 as shown in FIG. 21 for receiving portions of auxiliary belt 196 to facilitate connection of auxiliary belt 196 to mounting rod 230.

Auxiliary belt 196 includes a plate 236 inserted into slot 232 and coupled to end 233 of mounting rod 230 and a belt connector 238 is coupled to plate 236. Belt 196 also includes a plate 240 inserted into slot 234 and coupled to end 231 of mounting rod 230, a strap-tightening mechanism 242 mounted on plate 240, and a strap 244 fixed to belt connector 238 and slidably coupled to strap-tightening mechanism 242. In use, strap 244 is coupled to a child car seat 14 in a manner similar to the connection between strap 65 and child car seat 14 in FIGS. 1 and 2 and then tightened using strap-tightening mechanism 242 to mount child car seat 14 securely to seat foundation 186 to enhance stability of child car seat 14 on vehicle 12. It is understood that a variety of connectors may be used in accordance with the present invention to couple child car seat on seat foundation 186.

Figure 22:
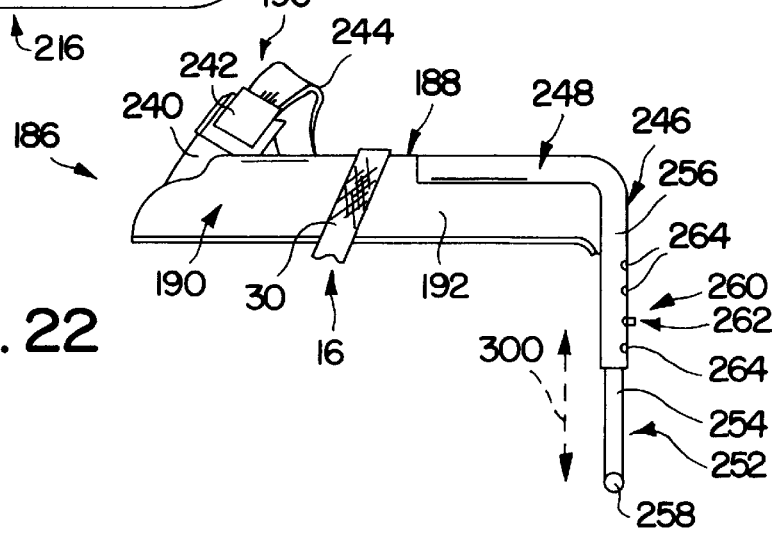
FIG. 22 is a side elevation view of a seat foundation similar to the seat foundation shown in FIGS. 18–20 that includes an adjustable-height stabilizer bar and a height-adjustment lock mechanism.

An adjustable stabilizer bar 246 is shown in FIG. 22 that is attached to seat pad 188. Adjustable stabilizer bar 246 is raised or lowered as shown by arrows 300 relative to seat pad 188 to account for various sizes of vehicle seats 12 to ensure that stabilizer bar 246 engages a vehicle floor provided in front of vehicle seat (not shown) when seat pad 188 carrying adjustable stabilizer bar 246 is installed properly on vehicle seat.

Stabilizer bar 246 is formed similarly to stabilizer bar 210 of FIG. 21 and includes a first L-shaped support art 248 coupled to first side wall 192 and a matching second L-shaped support arm (not shown but similar to arm 248) coupled to second side wall 194. Stabilizer bar 246 also includes a U-shaped floor brace 252 including a first vertical member 254 telescopingly engaging a vertical limb 256 of first L-shaped arm 248, a second vertical member (not shown but similar to first vertical member 254) telescopingly engaging a vertical limb (not shown but similar to limb 256) of second L-shaped support arm, and a horizontal bight portion 258 interconnecting vertical limbs included in U-shaped floor brace 252.

A locking mechanism 260 is provided to set the position of U-shaped floor brace 252 relative to seat pad 188 so as to adjust height of base 190 relative to vehicle floor (not shown). Locking mechanism 260 includes a series of apertures 264 formed in vertical member 256 and a springloaded detent 262 fixed to vertical member 254. A locking mechanism (not shown) similar to locking mechanism 260 is also used to couple the second L-shaped support arm (not shown) to the second vertical member (not shown) of U-shaped floor brace 252.

Although the invention has been described in detail with reference to certain preferred embodiments, variations and modifications exist within the scope and spirit of the invention as described and defined in the following claims.

What is claimed is:

1. An apparatus suitable for supporting a child car seat on a vehicle seat having a seat belt, the apparatus comprising
   a seat foundation adapted to lie upon the vehicle seat, the seat foundation including a base having an upper surface adapted to receive the child car seat thereon, spaced apart side walls extending away from the upper surface, and a seat-belt mounting catch positioned to lie in the upper surface in a location between the side walls, and
   an auxiliary belt coupled to the base, the auxiliary belt being adapted to cooperate with the base to couple the child car seat upon the seat foundation.

2. The apparatus of claim 1, wherein the base includes a back portion extending above the upper surface and lying between the side walls and the auxiliary belt is coupled to the back portion.

3. An apparatus suitable for supporting a child car seat on a vehicle seat having a seat belt, the apparatus comprising
   a seat foundation adapted to lie upon the vehicle seat, the seat foundation including a base having an upper surface adapted to receive the child car seat thereon, spaced apart side walls extending away from the upper surface, and a seat-belt mounting catch positioned to lie between the side walls, and
   an auxiliary belt coupled to the base, the auxiliary belt being adapted to cooperate with the base to couple the child car seat upon the seat foundation, the base including a back portion located above the upper surface and between the side walls the back portion including auxiliary slots extending therethrough and the auxiliary belt extending through the auxiliary slots.

4. The apparatus of claim 3, wherein the auxiliary belt includes opposite ends positioned to lie adjacent the upper surface of the base.

5. The apparatus of claim 3, wherein the base includes a lower surface and the seat-belt mounting catch is a mounting slot that extends between the upper surface and the lower surface.

6. The apparatus of claim 5, wherein the seat-belt mounting slot includes first and second short channels extending generally parallel to the spaced apart side walls and a long channel interconnecting the first and second short channels.

7. The apparatus of claim 6, wherein the short channels extend from the long channel toward the back portion of the base to define a tab portion that is adapted to engage the seat belt selectively.

8. An apparatus suitable for supporting a child car seat on a vehicle seat having a seat belt, the apparatus comprising
   a seat foundation adapted to lie upon the vehicle seat, the seat foundation including a base having an upper surface adapted to receive the child car seat thereon, spaced apart side walls extending away from the upper surface, and a seat-belt mounting catch positioned to lie between the side walls, and
   an auxiliary belt coupled to the base, the auxiliary belt being adapted to cooperate with the base to couple the child car seat upon the seat foundation, the base including a back portion from the upper surface between the side walls, the base including a lower surface, the seat-belt mounting catch being a mounting slot that extends between the upper surface and the lower surface and includes first and second short channels extending generally parallel to the spaced apart side walls and a long channel interconnecting the first and second short channels.

9. An apparatus suitable for supporting a child car seat on a vehicle seat having a seat belt, the apparatus comprising
   a seat foundation adapted to lie upon the vehicle seat, the seat foundation including a base having an upper surface adapted to receive the child car seat thereon, spaced apart side walls extending away from the upper surface, and a seat-belt mounting catch positioned to lie between the side walls, and
   an auxiliary belt coupled to the base, the auxiliary belt being adapted to cooperate with the base to couple the child car seat upon the seat foundation, wherein the base includes a lower surface and the seat-belt mounting catch is a mounting slot that is formed in the base and arranged to lie between the side walls and extend between the upper surface and the lower surface.

10. An apparatus suitable for supporting a child car seat on a vehicle seat having a seat belt, the apparatus comprising
    a seat foundation adapted to lie upon the vehicle seat, the seat foundation including a base having an upper surface adapted to receive the child car seat thereon, spaced apart side walls extending away from the upper surface, and a seat-belt mounting catch positioned to lie between the side walls, and
    an auxiliary belt coupled to the base the auxiliary belt being adapted to cooperate with the base to couple the child car seat upon the seat foundation, the base including a lower surface and the seat-belt mounting catch being a mounting slot that extends between the upper surface and the lower surface, the mounting slot including first and second channels extending generally parallel to the spaced apart side walls and a third channel interconnecting the first and second channels.

11. The apparatus of claim 10, wherein the base includes a front edge and an opposite back edge and the first and second channels extend from the third channel toward the back edge of the base to define a tab portion that is adapted to engage the seat belt selectively.

12. The apparatus of claim 11, wherein the auxiliary belt is coupled to the base adjacent to the back edge.

13. The apparatus of claim 10, wherein the base includes spaced-apart auxiliary slots and the auxiliary belt extends through the auxiliary slots.

14. The apparatus of claim 13, wherein the auxiliary belt includes opposite ends and a middle portion therebetween and the middle portion extends through the auxiliary slots and positions the opposite ends adjacent the upper surface of the base.

15. A car seat assembly suitable for mounting on a vehicle seat having a seat bottom, a seat back extending from the seat bottom, and seat belt, the assembly comprising a seat foundation adapted to lie upon the seat bottom of the vehicle seat, the seat foundation including a base having an upper surface, spaced apart side walls extending outwardly from the upper surface, and a seat-belt mounting catch positioned to lie between the side walls, the seat-belt mounting catch being formed to engage the seat belt selectively to couple the seat foundation upon the vehicle seat, a car seat including a seat base sized for placement upon the upper surface between the side walls of the base, a child-receiving seat supported by the seat base, a back portion extending from the child-receiving seat, and an aperture formed in the back portion, and an auxiliary belt coupled to the base, the auxiliary belt extending through the aperture formed in the back portion and cooperating with the base to couple the car seat upon the seat foundation selectively in a mounted position.

16. The car seat assembly of claim 15, wherein the car seat includes an upper lip formed to include a notch therein and the auxiliary belt extends through the aperture in the back portion and through the notches to position the car seat in a rear-facing mounted position.

17. The car seat assembly of claim 15, wherein the back portion is formed to include a set of spaced apart auxiliary slots therethrough and the auxiliary belt extends through the auxiliary slots.

18. The car seat assembly of claim 17, wherein the auxiliary belt includes opposite ends and a middle portion therebetween and one end of the auxiliary belt includes a buckle-locking mechanism and the opposite end is movable through the buckle-locking mechanism to selectively adjust the length of the middle portion selectively.

19. The car seat assembly of claim 17, wherein the back portion is formed to include a window therethrough and the auxiliary slots are positioned to lie on opposite sides of the window.

20. The car seat assembly of claim 17, wherein the back portion is formed to includes sets of auxiliary slots therethrough.

21. The car seat assembly of claim 15, wherein the base includes a back portion extending from the upper surface between the side walls and the auxiliary belt is coupled to the back portion.

22. The car seat assembly of claim 21, wherein the base includes a lower surface and the seat-belt mounting catch is a slot that extends between the upper surface and the lower surface.

23. The car seat assembly of claim 21, wherein the back portion of the car seat engages the back portion of the base when the car seat is in the mounted position.

24. The car seat assembly of claim 15, wherein the base includes a lower surface and the seat-belt mounting catch is a slot that extends between the upper surface and the lower surface.

25. The car seat assembly of claim 24, wherein the base includes spaced-apart auxiliary slots, the auxiliary belt includes opposite ends and a middle portion that extends therebetween, and the middle portion extends through the spaced-apart auxiliary slots and positions the opposite ends adjacent the upper surface of the base when in the mounted position.

26. The car seat assembly of claim 24, wherein the mounting slot includes first and second channels extending generally parallel to the side walls and a third channel interconnecting the first and second channels.

27. The car seat assembly of claim 26, wherein the base includes a front edge and an opposite back edge and the first and second channels extend from the third channel toward the back edge of the base to define a tab that is adapted to engage the seat belt selectively.

28. A method for enhancing the stability of a child car seat having a seat base, a seat portion, and a seat back formed to include an aperture therein upon a vehicle car seat having a seat bottom, a seat back, and a seat belt having a lap portion and a shoulder portion, the method comprising the steps of providing a seat foundation including a base having an upper surface, a lower surface, a back edge, a front edge, spaced apart side walls extending away from the upper surface between the back and front edges, and a slot extending through the base, the slot having short channels positioned to lie adjacent the side walls and a long channel extending between the short channels, providing an auxiliary belt that is coupled to the base selectively, positioning the base upon the seat bottom, extending the lap portion of the seat belt across the sidelwalls and upper surface of the base, pressing the lap portion into the long channel of the slot and toward the back edge of the base until the seat belt extends through the short channels and a portion of the seat belt is positioned to lie adjacent the lower surface of the base, positioning the seat base of the car seat upon the upper surface of the seat foundation, extending the auxiliary belt from the base through the aperture formed in the seat back of the car seat, and tightening the auxiliary belt until the seat base of the car seat is coupled to the upper surface of the seat foundation in a mounted position.

29. The method of claim 28, wherein the base of the seat foundation includes a back portion extending from the upper surface between the side walls and the back portion includes sets of spaced apart auxiliary slots therethrough, and further comprising the steps of selecting a set of auxiliary slots and extending the auxiliary belt through the selected set of auxiliary slots.

30. A car seat assembly suitable for mounting on a vehicle seat having a seat bottom, a seat back extending from the seat bottom, and seat belt, the assembly comprising a seat foundation adapted to lie upon the seat bottom of the vehicle seat, the seat foundation including a foundation base having an upper surface, a lower surface, spaced apart side walls extending outwardly from the upper surface, and a seat-belt mounting catch positioned to lie between the side walls, the seat-belt mounting catch being a slot formed in the foundation base and arranged to extend between the upper and lower surfaces to engage the seat belt selectively to couple the seat foundation upon the vehicle seat, a car seat including a seat base sized for placement upon the upper surface between the side walls of the base, a child-receiving seat supported by the seat base, and a back portion extending from the child-receiving seat and having a retaining portion, and a connector coupled to the foundation base, the connector engaging the retaining portion of the back portion and cooperating with the foundation base to couple the car seat upon the seat foundation selectively in a mounted position.

31. The car seat assembly of claim 30, wherein the foundation base includes a back portion extending from the upper surface between the side walls and the connector is coupled to the back portion.

32. The car seat assembly of claim 31, wherein the back portion of the car seat engages the back portion of the foundation base when the car seat is in the mounted position.

33. The car seat assembly of claim 30, wherein the mounting slot includes first and second channels extending generally parallel to the side walls and a third channel interconnecting the first and second channels.

34. The car seat assembly of claim 30, wherein the foundation base includes a front edge and a back edge extending between the side walls and the connector is positioned to lie adjacent the back edge.

35. The car seat assembly of claim 34, wherein the mounting slot includes first and second channels extending generally parallel to the side walls and a third channel interconnecting the first and second channels and the first and second channels extend from the third channel toward the back edge of the foundation base to define a tab that is adapted to engage the seat belt selectively.

36. Apparatus for supporting a child car seat on a vehicle seat provided with a seat belt, the apparatus comprising
   a seat foundation adapted to lie on the vehicle seat, the seat foundation including a bottom wall adapted to receive the child car seat thereon and formed to include a seat-belt mounting catch adapted to be coupled to the seat belt, and
   an auxiliary connector coupled to the seat foundation and adapted to retain the child car seat above the bottom wall of the seat foundation, and the seat-belt mounting catch includes a belt-engaging tab and a belt-receiving slot adjacent to the belt-engaging tab.

37. The apparatus of claim 36, wherein the belt-receiving slot is C-shaped.

38. The apparatus of claim 36, wherein the seat foundation further includes a pair of side walls appended to the bottom wall and arranged to lie in spaced-apart relation to position the seat-belt mounting catch therebetween and the belt-receiving slot includes first and second short channels lying in substantially parallel relation to the side walls and a long channel interconnecting the first and second short channels.

39. Apparatus for supporting a child car seat on a vehicle seat provided with a seat belt, the apparatus comprising
   a seat foundation adapted to lie on the vehicle seat, the seat foundation including side walls and a bottom wall adapted to receive the child car seat thereon and formed to include a seat-belt mounting catch including a belt-engaging tab spaced-apart from the side walls and adapted to be coupled to the seat belt, and
   an auxiliary connector coupled to the seat foundation and adapted to retain the child car seat above the bottom wall of the seat foundation.

40. The apparatus of claim 39, wherein a base of the seat foundation includes slots and the auxiliary connector passes through the slots formed in the base.

41. The apparatus of claim 39, wherein the seat foundation further includes a back wall arranged to lie at about a right angle to the bottom wall and the auxiliary connector is coupled to the back wall.

42. The apparatus of claim 41, wherein the seat foundation further includes a pair of side walls appended to the bottom wall and arranged to lie in spaced-apart relation and the back wall is coupled to the pair of side walls.

43. The apparatus of claim 39, wherein the auxiliary connector is coupled to the bottom wall.

44. The apparatus of claim 43, wherein the bottom wall is formed to include slots and the auxiliary connector passes through the slots formed in the bottom wall.

45. The apparatus of claim 42, wherein the bottom wall includes a front edge and a rear edge, a portion of the bottom wall adjacent to the rear edge is formed to include a spaced-apart pair of slots, the auxiliary connector passes through the spaced-apart pair of slots, and the seat-belt mounting catch includes a belt-receiving slot formed in another portion of the bottom wall located midway between the front and rear edge.

46. The apparatus of claim 45, wherein the belt-receiving slot is C-shaped.

47. The apparatus of claim 45, wherein the seat-belt mounting catch further includes a belt-engaging tab and the belt-receiving slot is arranged to lie around the belt-engaging tab.

48. Apparatus for supporting a child car seat on a vehicle seat provided with a seat belt, the apparatus comprising
   a seat foundation adapted to lie on the vehicle seat, the seat foundation including a bottom wall adapted to receive the child car seat thereon and formed to include a
   seat-belt mounting catch adapted to be coupled to the seat belt, and
   an auxiliary connector coupled to the seat foundation and adapted to retain the child car seat above the bottom wall of the seat foundation and the auxiliary connector is coupled to the bottom wall, the bottom wall is formed to include slots and the auxiliary connector passes through the slots formed in the bottom wall, and the seat-belt mounting catch includes a belt-receiving slot formed in the bottom wall.

49. Apparatus for supporting a child car seat on a vehicle seat provided with a seat belt, the apparatus comprising
   a seat foundation adapted to lie on the vehicle seat the seat foundation including a bottom wall adapted to receive the child car seat thereon and formed to include a seat-belt mounting catch adapted to be coupled to the seat belt, and
   an auxiliary connector coupled to the seat foundation and adapted to retain the child car seat above the bottom wall of the seat foundation, and a back wall is formed to include slots and the auxiliary connector passes through the slots formed in the back wall.

50. The apparatus of claim 49, wherein the seat-belt catch includes a belt-receiving slot formed in the bottom wall.

51. The apparatus of claim 50, wherein the seat-belt mounting catch further includes a belt-engaging tab and the belt-receiving slot is arranged to lie around the belt-engaging tab.

52. The apparatus of claim 50, wherein the belt-receiving slot is C-shaped.

53. Apparatus for supporting a child car seat on a vehicle seat provided with a seat belt, the apparatus comprising
   a seat foundation adapted to lie on the vehicle seat, the seat foundation including a bottom wall adapted to receive the child car seat thereon and formed to include a seat-belt mounting catch adapted to be coupled to the seat belt,
   an auxiliary connector coupled to the seat foundation and adapted to retain the child car seat above the bottom wall of the seat foundation, and
   a stabilizer bar coupled to the seat foundation and adapted to engage a floor of a vehicle containing the vehicle seat to limit movement of the seat foundation relative to the vehicle seat.

54. The apparatus of claim 53, wherein the stabilizer bar includes a first support arm coupled to one portion of the seat foundation, a second support arm coupled to another portion of the seat foundation, and a horizontal floor brace interconnecting the first and second support arms.

55. The apparatus of claim 54, wherein the seat foundation further includes a pair of side walls appended to the bottom wall, a first of the side walls includes said one portion of the seat foundation, and a second of the side walls includes said another portion of the seat foundation.

56. The apparatus of claim 54, wherein each of the first and second support arms is L-shaped.

* * * * *